Aug. 1, 1961     J. W. THROCKMORTON ET AL     2,994,307
VERTICAL TUBE HEATER

Filed March 3, 1960     3 Sheets-Sheet 1

INVENTORS
JOHN W. THROCKMORTON
JOHN S. WALLIS
BY
ATTORNEY

Aug. 1, 1961 J. W. THROCKMORTON ET AL 2,994,307
VERTICAL TUBE HEATER
Filed March 3, 1960 3 Sheets-Sheet 2
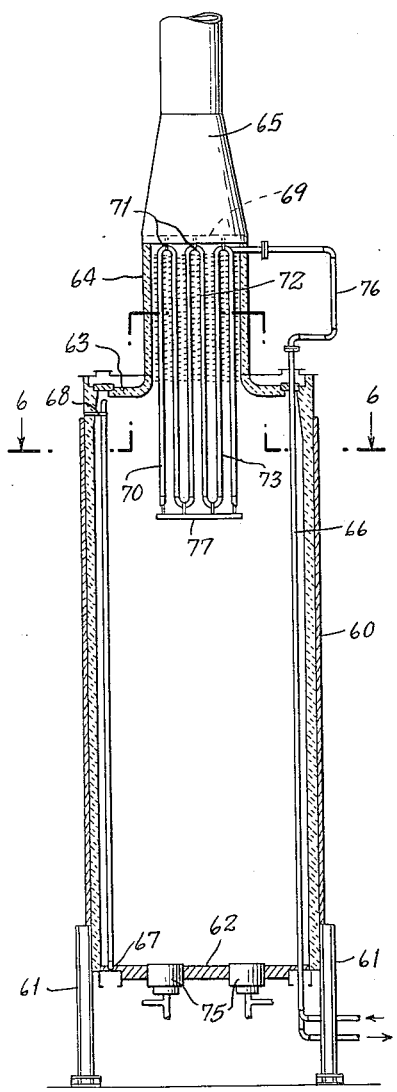
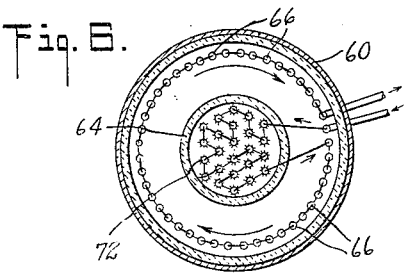
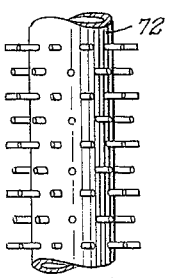
INVENTORS
JOHN W. THROCKMORTON
JOHN S. WALLIS
BY
ATTORNEY Aug. 1, 1961                J. W. THROCKMORTON ET AL                2,994,307
                                VERTICAL TUBE HEATER
Filed March 3, 1960                                              3 Sheets-Sheet 3
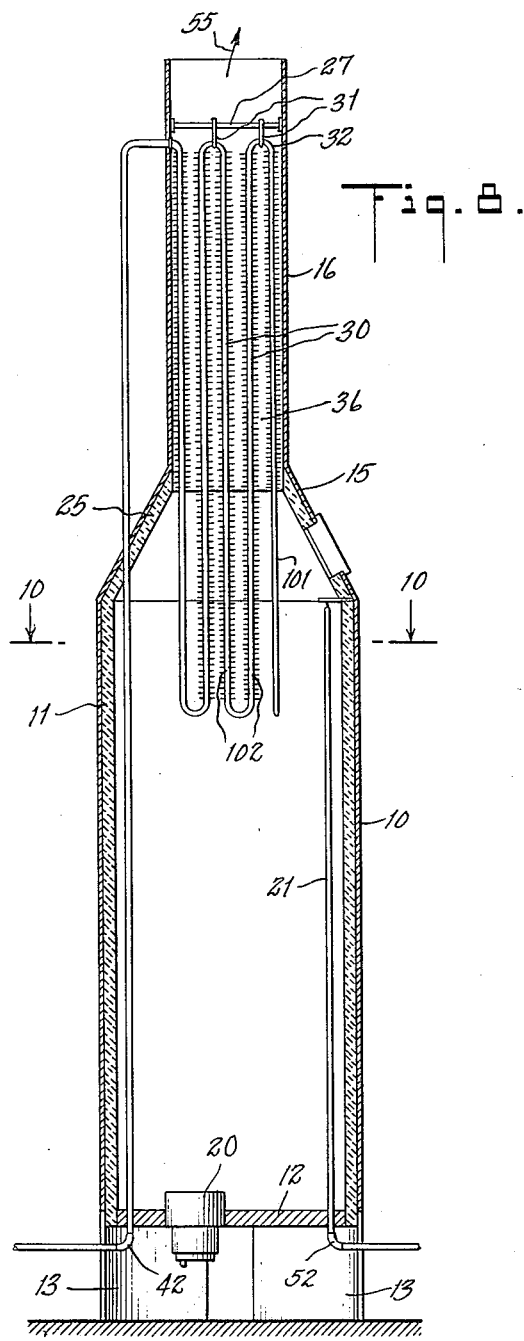
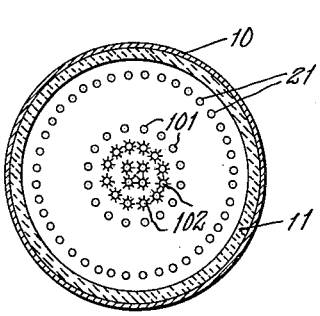
INVENTORS
JOHN W. THROCKMORTON
JOHN S. WALLIS
BY
ATTORNEY United States Patent Office 2,994,307
Patented Aug. 1, 1961

2,994,307
VERTICAL TUBE HEATER
John W. Throckmorton and John S. Wallis, New York, N.Y., assignors to Yuba Consolidated Industries, Inc., San Francisco, Calif., a corporation of Delaware
Filed Mar. 3, 1960, Ser. No. 12,627
2 Claims. (Cl. 122—356)

This invention pertains to furnaces or heaters, particularly such as are adapted for use in the petroleum and chemical industries, and more specifically relates to vertical tube heaters having a tall cylindrical furnace chamber and heat exchange tubes arranged in a cylindrical bank close to the inner wall of the furnace chamber.

One object of this invention is to provide a furnace consisting of all vertical tubes with three heat absorbing zones as follows: a primary radiant zone out of the path of the combustion products and subject to radiant heat absorption therefrom and to reradiation from the hot refractory lining of the furnace wall, a secondary radiant zone in the path of the combustion products subject to radiant heat in the main furnace chamber, to reradiation from the furnace wall and to convection heat absorption, and a convection zone in which heat is absorbed primarily by convection. The secondary radiant heat absorbing zone and the convection heat absorbing zone are together embodied in a shock coil, which term is used herein to mean a coil which performs both the usual function of a preheater or economizer by having its upper portion made up of tubes with fins or other extended surface elements arranged in the furnace outlet or stack where it absorbs heat largely by convection and also the function of a primary heating coil by having relatively long smooth tubes which extend downwardly into the furnace chamber well within the main cylindrical bank of vertical tubes, whereby the temperature of the inlet oil is raised to a temperature more nearly approaching the high temperatures desired in the main vertical tube heating coil.

The shock coil thus raises cold oil to a high temperature and relieves the main coil of its heat load to such an extent that the latter may do its work more smoothly and efficiently or may carry the outlet temperature to an unusually high degree suitable for modern processes in the petroleum and chemical industries.

Another object of this invention is to provide a frusto-conical refractory portion at the top of the combustion chamber with steeply sloping sides to reflect radiant heat to the secondary radiant zone so that this zone will be subject to heat absorption by reradiation from the frusto-conical section in addition to radiation and convection heat absorption from the products of combustion.

Another object of this invention is to provide a furnace with a low draft loss which essentially requires no stack. This is accomplished in part by reducing the flue gas turbulence at the entrance of the convection zone by having a frusto-conical transition portion at the top of the combustion chamber so that there is a smooth streamlined flow with no intervening baffles for the products of combustion entering the convection zone. To further reduce the draft loss, the tubes in the path of the flue gas are placed on relatively wide centers as compared with the spacing of the tubes in the primary radiant section. For example, the tubes in the radiant zone which are out of the path of the flue gas are spaced from one another on approximately 2 diameter centers, and the tubes in the path of the flue gas are spaced from one another on 3 diameter centers. Nevertheless, they have prominent extended surface elements and are arranged in the form of a nest so that no baffles are necessary.

Another object of this invention is to provide a furnace consisting of an upper bank of vertical tubes having bare tube and extended surface zones in the path of the flue gas and a lower bank of vertical tubes in the combustion chamber out of the path of the flue gas, arranged so that any tube of each tube bank can be removed from the combustion chamber. By lowering any of the tubes in the upper bank of tubes into the combustion chamber, tubes from both the upper and lower sections can be removed through a common access door at the top of the combustion chamber.

Referring to the drawings:

FIG. 5 is an elevation, largely in section, of a furnace and its stack, the cylindrical bank of primary heating tubes being indicated in FIG. 5 and shown more completely in the sectional plan view of FIG. 6.

FIG. 6 is a sectional plan taken on the line 6—6 of FIG. 5.

FIG. 7 is an elevation shown on a larger scale of a typical extended surface portion of the tubes illustrated in FIGS. 1, 5, 8 and 9.

FIG. 8 is an elevation largely in section of a furnace in which the inner tubes of the shock coil which are shielded by the outer row of smooth tubes, are provided with extended surface elements throughout their entire length.

FIG. 9 is a sectional plan view taken on the line 9—9 of FIG. 8.

Figure 2:
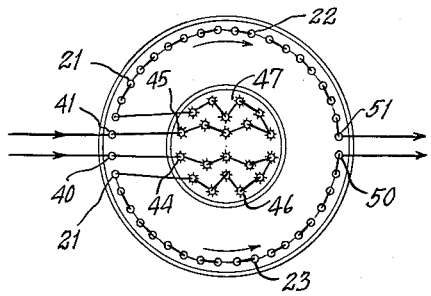
FIG. 2 is a flow diagram of a two-pass heater indicating the connections between the primary radiant tubes and the combined radiant and convection tubes. This figure also shows the relative position of different tube banks in the furnace.
Figure 3:
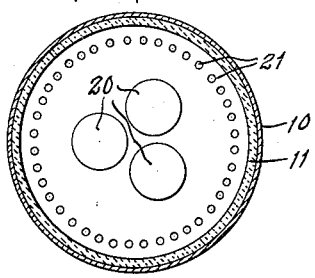
FIG. 3 is a sectional plan view taken on the line 3—3 of FIG. 1.
Figure 4:
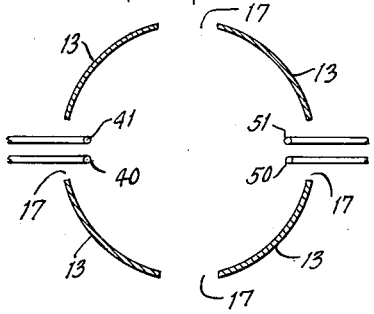
FIG. 4 is a sectional plan view taken on the line 4—4 of FIG. 1.

The heater illustrated in FIGS. 1 to 4, inclusive, comprises a tall cylindrical furnace shell 10 having a refractory lining 11, a bottom plate 12 and apron plates 13 which extend to the foundation 14 and support the heater. They are arranged to give large access openings 17 on opposite sides of the heater, as shown in FIG. 4. A frusto-conical furnace portion 15 having a steep slope extends upwardly from the top of the cylindrical shell 10, and a smaller diameter cylindrical portion 16 of the furnace is concentric with the main shell 10 and extends upwardly from the top of the frusto-conical portion 15.

Symmetrically arranged and mounted in bottom plate 12 are upshot burners 20, which are shown in FIG. 3. These burners are arranged to discharge products of combustion axially upward within the center of the furnace shell, and the flue gases from which the heat is largely absorbed by the tubes, as hereinafter described, are discharged from the top through section 16 without the necessity of providing the usual tall stack.

A cylindrical bank of primary radiant heating tubes 21 is spaced within the furnace shell concentric therewith, and preferably the tubes are uniformly and equally spaced around the circle. This bank of tubes has a diameter somewhat smaller than the diameter of the furnace shell so that the tubes are spaced from the refractory lining 11 by a sufficient distance to permit substantial reradiation from the lining to the back of the tubes, the inner surfaces of which are subject to direct radiation from the products of combustion passing upwardly in the center of the furnace.

As shown in FIG. 3, the tubes 21 are equally spaced from one another and, as shown in FIG. 2, in this particular embodiment of this invention they are divided into two sections designated 22 and 23.

Figure 1:
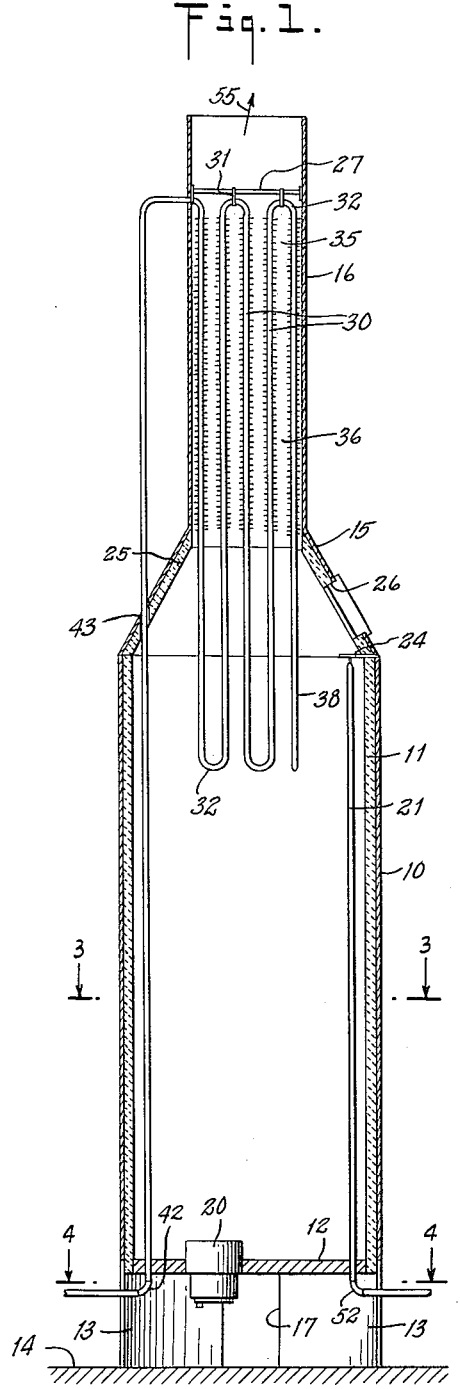
FIGURE 1 is an elevation, largely in section, of a stackless heater embodying this invention, certain of the vertical tubes being omitted in this figure for clarity.

The tubes 21 are interconnected by the usual return bends at the bottom, as indicated in the flow diagram of FIG. 2, and they are supported from the bottom plate 12, which takes the entire weight of the tube bank composed of sections 22 and 23. The tubes are maintained in position by brackets 24, which are located at the top of the furnace shell 10 and extend inwardly and are each attached to one of the return bends, as shown in FIG. 1.

The frusto-conical portion of the heater 15 is also provided with a refractory lining 25 and has one or more large openings 26 provided with manhole covers so that ready access may be had for the removal of any of the tubes as occasion may require.

The portion 16 of the furnace has cross rods 27, which may be in the form of a grill, mounted near the top from which tubes 30 are suspended by hangers 31. These tubes are more widely spaced apart than is usual. For example, if the tubes 21 of the main radiant section of the heater are spaced from one another on two diameter centers, it is preferable to space tubes 30 on three diameter centers.

Tubes 30 are not arranged in a single cylindrical bank but are arranged to form a nest of tubes, as shown in FIG. 2, which tubes are about equally distributed through the cross sectional area of the furnace portion 16.

The tubes 30 are interconnected by return bends 32, as shown in FIG. 1, and form a shock coil which is composed of a convection section having extended surfaces, preferably formed by relatively long radiating spikes 35, and well adapted to absorb heat from the flue gases passing through portion 16 of the furnace, without creating the usual resistance to flow, and a combined radiant and convection section as hereinafter described.

The convection section extends from the return bends 32 at the top, to the bottom of the furnace portion 16 and is designated 36. The tubes 30 extend downwardly through the frusto-conical portion 15 of the furnace and substantially below the top of the main bank of radiant tubes 21, as shown in FIG. 1. The tubes in this part of the tube nest do not have extended surfaces and constitute a combined radiant and convection section which is designated 38.

As shown in the drawings, the combined radiant and convection section extends approximately one-third of the distance from the top of frusto-conical furnace portion 15 to the bottom of the furnace. The tubes of this section extend downwardly within the tube bank 21 approximately one-fifth of the length of the primary tubes 21.

In the tube arrangement shown in FIG. 2, two adjacent vertical tubes 40 and 41 constitute inlet tubes and have inlet connections as indicated at 42 in FIG. 1. These tubes extend upwardly through the frusto-conical portion 15, as indicated at 43, and are connected to the top of two adjacent inlet tubes 44 and 45 of the shock coil bank. The fluid to be heated after passing upwardly through the inlet tubes 40 and 41 enters the top of the shock coil tubes 44 and 45. The fluid then passes through tube groups 46 and 47 of the shock coil tubes and then through connections to the primary radiant tubes 21, which are located adjacent to the inlet tubes 40 and 41. The fluid then passes through the radiant tube sections 22 and 23 and the tube connections and finally flows downward through outlet tubes 50 and 51 at the opposite side of the furnace. These tubes have outlet connections 52, as indicated in FIG. 1, below the bottom plate 12. Thus in this arrangement fluid to be heated enters the bottom of the heater on one side of the furnace and is discharged through two outlet connections at the bottom of the furnace on the opposite side.

In operation products of combustion are forced upwardly from the upshot burners 20 and the flame and hot gases extend upwardly through the center of the heater and give up a large percentage of heat by radiation to the main tubes 21 and to the refractory lining 11. The products of combustion then pass upwardly around and among the shock coil tubes 30 and heat the refractory wall 25 of the frusto-conical portion 15 so that heat is applied to the section 38 of the upper nest of shock coil tubes by both radiation and convection, and the lower ends of these tubes, which have a smooth surface as already described, are heated by radiation and convection from the main furnace flame and hot gases and also by reradiation from the refractory surface 25.

The products of combustion then flow among and around the extended surface section 36 of the tubes 30 and largely give up the remaining heat by convection to the spikes or other extended surface elements before they pass upwardly out of the top of the heater as indicated by arrow 55.

The usual stack is not necessary because of the low resistance to the upward flow of the products of combustion in the arrangement here shown, and hence the heater of FIGS. 1 to 4, inclusive, is designated a stackless heater.

From the flow diagram of FIG. 2 it is clear that the tubes are connected in two separate paths for parallel flow, but a single flow may be employed as shown in FIG. 6 and as hereinafter described.

The heater structure of FIGS. 1 to 4, inclusive, which avoids the necessity of using a stack is now regarded as the preferred structure, since it can be built at a saving of approximately 15% relative to the cost of building a heater structure of comparable capacity using the usual stack, as in the heaters of FIGS. 5 and 6.

This is possible primarily because the stack, if needed to provide upward draft of high velocity, extends from 30 to 50 feet above the top of the heater and not only adds its own cost, which is substantial, but makes it essential largely to strengthen the furnace frame and supporting structure in order to meet the usual specification that it must withstand a wind velocity of 150 miles per hour intensity.

The furnace illustrated in FIGS. 5 and 6 comprises a cylindrical furnace shell 60 supported by a plurality of legs 61, only two of which are shown, which are adapted to support the furnace with its bottom plate 62 sufficiently high above the foundation level to permit workmen to pass underneath. At the top of the main cylindrical furnace is an annular bridge wall 63 which supports a supplementary cylindrical furnace shell 64, which is about half the diameter of the main furnace shell 60. A stack 65 is mounted at the top of the supplementary cylindrical furnace 64.

Within the main body of the furnace shell 60 and spaced from its inner wall are a large number of heat exchange tubes 66 which constitute a cylindrical bank of tubes as indicated in FIG. 6. The tubes 66 may be provided with return bends at the top and bottom in the usual manner, and they are supported from the bottom plate 62 as indicated at 67. The tubes are guided at their upper ends by lateral brackets 68.

At the top of the supplementary furnace chamber 64 are cross bars which may be in the form of a grill 69 from which a nest of tubes 70, formed into a shock coil by return bends, is hung by suspenders 71. The tube nest 70 is distributed throughout furnace chamber 64 and projects downwardly into the furnace 60 for about half of its length. The upper half of this shock coil tube nest 70, which is designated zone 72, has extended surface means so as to absorb heat primarily by convection. The lower ends of the nest 20 are bare tubes and are subjected to both radiant heat from the main furnace and convection heat from the hot furnace gases which flow around and over them and thence upwardly through the convection zone 72 of the heater into the stack.

The furnace is provided with burners 75 which discharge flame upwardly in an axial direction within the furnace 60. A single burner may be substituted for the two or more burners indicated in FIG. 5. External jumpers 76, only one of which is shown, connect the inlet and outlet tubes of the cylindrical tube bank 66 to the inlet and outlet tubes of the tube nest 70, as clearly shown in FIG. 6. These jumper connections may be established inside of the furnace, if desired.

It is of special significance that the tubes 73 of the tube nest 70 extend for a considerable distance, e.g. for from 10% to 20% downwardly into the furnace 60, and thus they receive radiant heat from the hot gases which pass upward. Also radiant heat is reflected from the inner walls of the furnace shell 60, which is preferably made of steel with a refractory lining, in addition to receiving convection heat by reason of the flow of gases inwardly at the top of the main furnace and upwardly around and between the tubes of the tube nest 70.

In some cases it has been found desirable to mount a heat resistant baffle 77 at the lower end of the tube nest 70 to protect the bends of the coil from the direct radiant heat of the flame from the burners. This, however, is not an essential element and is preferably omitted.

The arrangement described has the distinct advantage of most effectively absorbing heat from the burners in the heat exchange cylindrical tube bank 66 and in the shock coil including both zone 73 and the extended surface zone 72.

In the arrangement shown in FIG. 5 the zone 73 of the shock coil, which is made up of the bare tubes, extends downwardly for a considerable distance, e.g. from 10% to 20% into the heater below the top of the cylindrical tube bank 66.

While two burners are shown in FIG. 5, a plurality of burners may be arranged in a circular formation in the bottom plate, or a single central burner (not shown) may be employed, but in all cases it is preferable that the burners discharge flame upwardly in an axial direction so that the cylindrical tube bank 66 of FIG. 5 is heated almost entirely by radiation, whereas as already described, zone 73 of the shock coil is heated by both radiation and convection, and the extended surface shock coil zone in FIG. 5 receives heat almost entirely by convection from the hot gases which flow upwardly between and around the tubes, over the extended surface elements, through the grills and into the stack.

While reference has been made to the extended surface portions of the tubes in FIGS. 1 and 5, and in some instances they have been referred to as fin tubes, it is preferable, particularly in the stackless heater shown in FIG. 1, to employ comparatively long studs arranged in staggered relation as shown in detail in FIG. 7, because by this means the flue gases come in contact with the studs even though the tubes, as already described, are spaced relatively far apart and yet the studs offer minimum resistance to flow. This contributes to the low pressure drop in the heater from bottom to top and renders the stack unnecessary, as shown in FIG. 1.

The radiant banks of tubes 21 of FIG. 1 and 66 of FIG. 5 either may be supported at the bottom and guided at the top or may be hung from the top, the design being determined by the expansion problem. For example, the tubes may be connected in two passes, as shown in FIG. 2, or in several passes, and the number of connections between the main tubes and the shock tubes at the top of the heater may make it desirable to hang the main tubes from the top of the furnace to avoid expansion strains.

The return bends at the top and bottom of the main tubes may be welded or provided with cleanout plugs or removable U bends, as desired.

A heater which constitutes another modification of this invention is shown in FIGS. 8 and 9 and corresponds largely to that of FIGS. 1 to 4, inclusive, the same reference characters being used in each case where applicable. The furnace of FIGS. 8 and 9 includes a shock coil composed of a nest of heating tubes which are suspended from the grill 27 by hangers 31 and extend as much as 10% to 20% below the upper ends of the tubes 21 and the frusto-conical furnace portion 15. The shock coil comprises an outer circular bank of tubes 101 which have extended surface means from the top to the upper end of the frusto-conical section and have smooth surfaces below that point. In addition, tubes 102, including at least one row, but preferably two or more as shown in FIG. 9, have extended surface means throughout their entire length. This is clearly indicated in cross sectional elevation in FIG. 9.

This modification of the invention has the advantage that the outer banks 101 of the tubes which project down into the main furnace from the supplemental heater have smooth surfaces and largely absorb heat by direct radiation from the hot gases arising from the burners at the bottom of the main heater, by reradiation from the refractory lining 25 of the frusto-conical section and from the refractory lining 11 of the main furnace. On the other hand, the tubes of the nest which are substantially screened by the outer circular banks 101 have extended surface means and largely absorb heat by convection.

The arrangement in the furnace is such, however, that the circular bank of tubes 101 obtains part of its heat by convection and the inner tubes 102 which extend down into the main furnace receive a part of their heat by radiation.

The structures illustrated and described are preferred embodiments of the invention, but they may be varied without departing from our inventive concept, and only such limitations should be imposed as are indicated in the appended claims.

This application is a continuation-in-part of our application Serial No. 744,894, filed June 25, 1958, which in turn was a continuation-in-part of our application Serial No. 696,441, filed November 14, 1957.

We claim:

1. A vertical heater comprising a tall cylindrical furnace shell having a steeply sloping throat at the top, a refractory lining for said shell and throat, and a relatively small diameter cylindrical auxiliary shell mounted at the top of the throat and concentric with the tall cylindrical furnace shell, at least one central burner at the bottom discharging flame and hot combustion gases axially upward in the center of the furnace shell, a plurality of heat exchange tubes arranged in a cylindrical bank within the furnace shell, said tubes being spaced from the shell and from each other and forming a primary radiant section of the heater adapted to be heated by radiation from the central column of flame and hot gases and by reradiation from the refractory lining of the furnace shell, and a shock coil comprising a nest of vertical tubes substantially filling the auxiliary shell and extending axially through the throat directly into the path of the central column of flame and hot gases and for a substantial distance downward within the bank of radiant heat exchange tubes which is approximately from 10% to 20% of the total length of the cylindrical bank of radiant tubes, said shock coil composed of a convection portion within the auxiliary furnace shell and extended surface means on the tubes of the shock coil in said portion and a dependent portion which extends downwardly through the throat and well within the main bank of heat exchange tubes and being subjected to radiant and convection heat from the flame and hot gases and to reradiation from the refractory lining of the throat and interconnections between said shock coil and the tubes of the main bank whereby the fluid to be heated passes first through the shock coil and then through the tubes of the main bank.

2. A vertical heater comprising a tall cylindrical furnace shell having a steeply sloping throat at the top, a refractory lining for said shell and throat and a relatively small diameter cylindrical auxiliary shell mounted at the top of the throat and concentric with the tall cylindrical furnace shell, at least one central burner at the bottom discharging flame and hot combustion gases axially upward in the center of the furnace shell, a plurality of heat exchange tubes arranged in a cylindrical bank within the furnace shell, said tubes being spaced from the shell and from each other and forming a primary radiant section of the heater adapted to be heated by radiation from the central column of flame and hot combustion gases and by reradiation from the refractory lining of the furnace shell, and a shock coil comprising a nest of vertical tubes within the auxiliary shell and extending axially downwardly through the throat directly into the path of the central column of flame and hot gases and for a substantial distance within the bank of radiant heat exchange tubes which is approximately from 10% to 20% of the total length of the cylindrical bank of radiant tubes, said shock coil composed of a convection portion within the auxiliary furnace shell and extended surface means on the tubes of the shock coil in said portion and a dependent portion which extends downwardly through the throat and well within the main bank of heat exchange tubes and being subjected to radiant and convection heat from the flame and hot gases and to reradiation from the refractory lining of the throat, and extended surface elements only on the inner tubes of the dependent portion of the shock coil tubes which are shielded by the outer smooth surface row of said tubes and are largely heated by convection, means for connecting the shock coil to the source of fluid to be heated and to the tubes of the main bank whereby the preheated fluid is supplied from the shock coil to the main tube bank.

References Cited in the file of this patent

UNITED STATES PATENTS

| | | |
|---|---|---|
| 2,340,289 | Wallis et al. | Feb. 1, 1944 |
| 2,745,388 | Becker | May 15, 1956 |